July 16, 1968     A. H. MÜLLER ETAL     3,392,987
DISENGAGEABLE COUPLING INTENDED FOR A MULTI-WHEEL STEERING
SYSTEM IN MOTOR VEHICLES, ESPECIALLY
CROSS-COUNTRY VEHICLES
Filed March 10, 1966
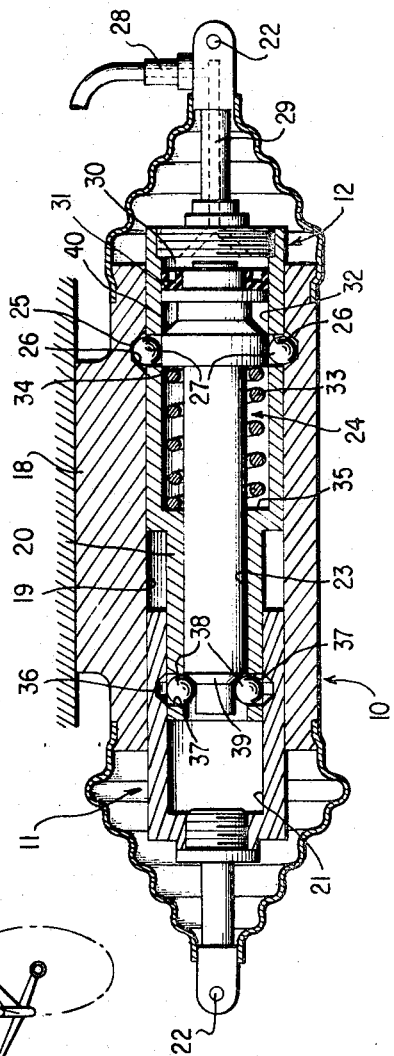
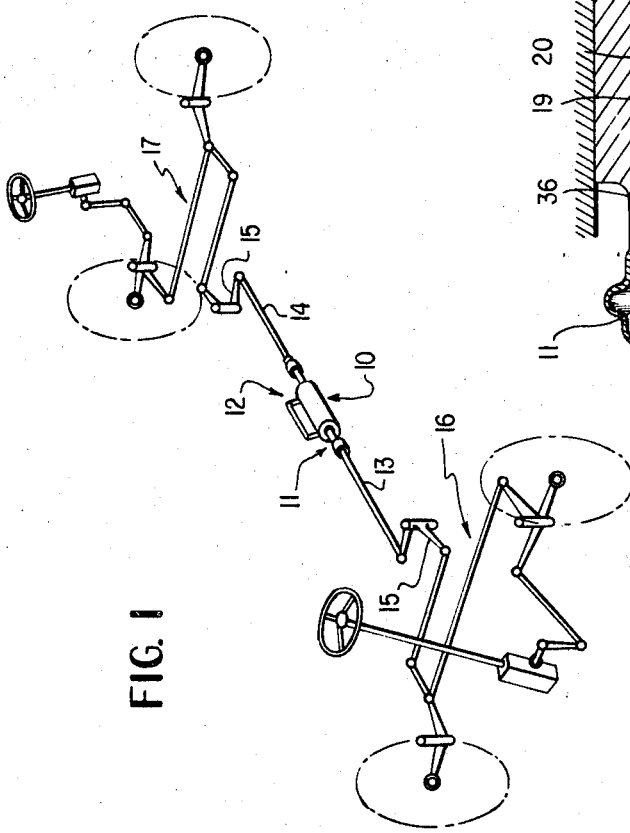
INVENTORS.
ALFRED H. MÜLLER
HELMUT HÖHN
BY
ATTORNEY

United States Patent Office 3,392,987
Patented July 16, 1968

3,392,987
DISENGAGEABLE COUPLING INTENDED FOR A MULTI-WHEEL STEERING SYSTEM IN MOTOR VEHICLES, ESPECIALLY CROSS-COUNTRY VEHICLES
Alfred H. Müller, Waiblingen, and Helmut Höhn, Gaggenau, Germany, assignor to Daimler-Benz Aktiengesellschaft, Stuttgart-Unterturkheim, Germany
Filed Mar. 10, 1966, Ser. No. 533,339
Claims priority, application Germany, Mar. 10, 1965, D 46,737
17 Claims. (Cl. 280—91)

ABSTRACT OF THE DISCLOSURE

A disengageable coupling intended for a multi-wheel steering system in motor vehicles, especially cross-country type vehicles, which is arranged as connecting means between two parts of a force or power-transmission device whose first part is connected with the front axle steering linkage or linkages and whose second part is connected with the rear axle steering linkage or linkages, and which coupling is adapted to be shifted and actuated in such a manner that either—for a simultaneous steering of all steerable axles—the two parts of the power-transmitting device are rigidly connected with each other or that—for a steering of only the front axle or axles—the two parts of the power-transmitting device are disengaged from one another and simultaneously therewith the part of the coupling operatively connected with the rear axle linkage or linkages is rigidly held fast.

Background of the invention

Necessary prerequisites for a completely satisfactory operation of such a coupling are, on the one hand, a good transmission of the manual shifting force which is as free as possible from losses and play, to the coupling, and, on the other, the desired shifting position has to be preselectable at will; that is independently of the prevailing position of the vehicle wheels, whereby, however, the coupling itself carries out the desired shifting operation only with the wheels of the vehicle in a straight driving position.

With a known coupling of the aforementioned type, the coupling of the two parts, each connected with a respective steerable axle, of the power-transmitting member constructed as push-and-pull rod and the securing of the part connected with the rear axle steering linkage takes place by means of an axially displaceable shifting sleeve provided at both end faces with claws, the part of the power-transmission system connected with the rear axle steering linkage being secured on this sleeve by way of a shifting lever. There are also provided in such prior art construction two engaging parts having claws and recesses or apertures for the engagement of the shifting sleeve whereby one engaging part is rigidly connected with the vehicle body and the other engaging part is pivotally connected by way of a shifting lever at the part of the vehicle power-transmitting member operatively connected with the front axle steering linkage. The axial displacement of the shifting sleeve and therewith the connecting and locking operations described above take place mechanically by way of a shifting fork and shifting linkages. A telescopic-like elastic member is inserted into the shifting linkage in order to enable a preselectability of the coupling. The disadvantages of this prior art coupling are, on the one hand, conditioned by the bulky construction, the open arrangement unprotected against road dust and road dampness and, on the other, a space-consuming actuating linkage is necessary whereby during preselection of a shifting position the force for the prestressing of the telescopic-like elastic member has to be applied manually.

Summary of the invention

The present invention aims at eliminating the aforementioned disadvantages. As solution to the underlying problem, the present invention proposes that the disengageable coupling is constructed as a coupling actuated by a pressure medium and includes a housing rigidly secured at the vehicle which accommodates within a continuous cylindrical aperture two plunger-piston-like coupling parts—each connected with a respective part of the power-transmitting device—in coaxial and mutually overlapping manner, whereby on the one hand, locking means are provided between the coupling part coordinated to the rear axle steering linkage and the housing and, on the other, connecting means adapted to be connected with one another are provided between the two coupling parts, with the locking and connecting means being adapted to be actuated by a pressure medium.

The actuation of the coupling by a pressure medium offers the advantage that the pressure medium circulatory systems already present in every vehicle, for example, the pressure-lubricating system, can be used without any difficulty also for the actuation of the disengageable coupling in accordance with the present invention. Furthermore, there exists the advantage that the pressure line serving for the supply of the pressure medium is considerably less demanding as regards its space requirements than a rigid actuating linkage of a mechanically actuated coupling. Furthermore, the control of the pressure and therewith of the coupling—for example, by means of a valve—requires only very small manual forces. Moreover, with a pressure-medium actuated coupling according to the present invention, no special elastic member is necessary for a preselectability thereof, but instead a pressure built up in the pressure line, for example, by means of a valve, is sufficent. Altogether, the coupling according to the present invention excels—conditioned on the pressure medium actuation— by a space-saving and compact construction protected against soiling which additionally assures a simple assembly and disassembly of the entire coupling.

The pressure-medium actuated coupling of the present invention is suited both for a power-transmission member constructed as push-pull rod—whereby the parts thereof are disposed in alignment with the coupling and can be secured directly at the coupling parts—as also with the use of a power-transmitting member constructed as torsion rod whereby the securing thereof at the coupling parts takes place by way of shifting levers.

An actuation of the connecting and locking means by a pressure medium can take place in principle in any desired manner—for example, by way of diaphragms or the like. However, the present invention provides preferably that one coupling part forms simultaneously a pressure cylinder and that an axially displaceable actuating piston, which is axially displaceable against a spring force and is actuated by the pressure medium, is arranged within this coupling part for the actuation of the locking and connecting means.

The present invention recommends as particularly suited for the construction as pressure cylinder and for the accommodation of the actuating piston, the coupling part coordinated to the rear axle or axles which anyhow is held fast or secured rigidly during longer periods of time; namely, during drives on normal roads where only a front axle steering is necessary. The supply of the pressure medium to the coupling can take place in principle at any desired place whereby the pressure medium can then be supplied within the coupling, for example, by way of bores, to the pressure cylinder. The present invention, however, proposes as preferred solution that a pressure medium connection and a helical compression spring are coordinated to the coupling part accommodating the actuating piston which spring is supported, on the one hand, against a collar at the actuating piston and, on the other, against a collar at the inner walls of the coupling parts.

The locking and connecting means actuated by means of the actuating piston may be constructed in principle in any known manner, for example, in the manner of a locking bolt mechanism. However, the present inventio proposes in a preferred construction that ball detents serve as locking and connecting means and that the connecting balls arranged in radial bores of the inner coupling part are pressed radially outwardly into an annular groove provided in the outer coupling part upon application of pressure to the actuating piston by means of an inclined surface at the actuating piston so that both coupling parts are connected with each other, and that the locking balls located in an annular groove provided in the housing as well as in radial bores provided in the coupling part coordinated to the rear axle, are released for shifting in the inward direction upon application of pressure on the actuating piston.

The present invention also proposes for the actuating of the locking means that the locking balls arranged in the radial bores of the coupling part coordinated to the rear axles are pressed radially outwardly into the annular groove of the housing by means of a further inclined surface at the actuating piston after relieving of the pressure line, i.e., upon return of the actuating piston by the compression spring so that they lock both parts with respect to each other and simultaneously the connecting balls are released or freed for shifting or falling back in the inward direction.

As to the construction of the annular grooves, it should be mentioned that the depth thereof in every case has to be smaller than the corresponding ball radius. As to the rest, they may be of different construction as regards the cross section thereof, for example, of circular segmental shape, oval, or the like. However, according to a preferred embodiment, the present invention proposes that the annular grooves serving for the accommodation of the locking and connecting balls have a trapezoidally shaped cross section. The advantage of this construction of the annular grooves consists in that with uniform displacement of the coupling parts, the balls are forced inwardly with uniform radial force by the inclined surfaces of the trapezoid whereas, for example, with annular grooves of circular segmentally shaped cross section, they would be thrust inwardly in an explosion-like manner after an initial restraint or inhibition.

Accordingly, it is an object of the present invention to provide a coupling mechanism especially for multi-wheel steering systems in motor vehicles of the type described above which eliminates by extremely simple means the drawbacks and shortcomings encountered with the prior art constructions.

Another object of the present invention resides in a coupling of the type described above which enables a transmission of the manual shifting force that is as free from losses and play as possible, requires relatively little manual force for the engagement and disengagement of the coupling parts and permits a preselection to the desired shifting position independently of the position of the vehicle wheels.

A further object of the present invention resides in a coupling mechanism for multi-wheeled steering systems of motor vehicles which not only excels by its compact and simple construction requiring relatively little space but which additionally obviates the need for bulky and space-consuming mechanical actuating means.

Still another object of the present invention resides in a coupling for multi-wheel steering systems that requires only very little manual force to actuate the same, regardless of the condition of the vehicle wheels and/or the pre-existing condition of the coupling.

A further object of the present invention resides in a coupling of the type described above which not only can be readily installed and disassembled in case of need but which also permits the use of already present pressure medium circulation systems for the actuation thereof.

Another object of the present invention resides in a coupling especially for multi-wheel steering systems which not only achieves all of the aforementioned objects and advantages by extremely simple and operationally reliable means but which additionally assures long life in the proper operation thereof by reason of protection against soiling from the road.

Brief description of the drawing

These and other objects, features, and advantages of the present invention will become more obvious from the following description when taken in connection with the accompanying drawing which shows, for purposes of illustration only, one embodiment in accordance with the present invention and wherein:

FIGURE 1 is a somewhat schematic perspective view of one possibility of installation of a disengageable coupling in accordance with the present invention within a vehicle having two steerable axles; and FIGURE 2 is a longitudinal cross-sectional view through the disengageable coupling in accordance with the present invention.

Detailed description of the drawing

Referring now to the drawing wherein like reference numerals are used throughout the two views to designate like parts, and more particularly to FIGURE 1, as may be readily seen from this figure, the disengageable coupling generally designated by reference numeral 10 is secured with its coupling parts generally designated by reference numerals 11 and 12 directly at the two parts 13 and 14, respectively, of a power-transmission member constructed as push and pull rod. The power-transmission device 13, 14 is operatively connected by way of angle levers or bell cranks 15 with the steering linkages generally designated by reference numerals 16 and 17 of the front and rear axle, respectively.

According to FIGURE 2, the disengageable coupling 10 includes a housing 18 rigidly secured at the vehicle in any conventional manner and provided with a cylindrical bore 19. Two plunger-piston-like coupling parts generally designated by reference numerals 11 and 12 are axially displaceably supported within the bore 19 of the housing 18 in such a manner that the coupling part 12 with its hollow pin portion 20 extends into a central bore 21 of the coupling part 11. As already indicated hereinabove, the coupling parts 11 and 12 may be secured by means of lugs or eyes 22 provided at the outer ends of the coupling parts 11 and 12 directly to the parts 13 and 14 of the power-transmitting member.

An actuating piston generally designated by reference numeral 24 is arranged axially movably in the coupling part 12 within a bore 23 thereof. The actuating piston 24 serves for the actuation of means for connecting the individual coupling parts 11 and 12 with each other as well as for the actuation of a locking mechanism which fixes the coupling part 12 connected with the power-transmission part 14 and therewith with the rear axle steering linkage 17 at the housing 18 and thus produces the desired locking effect. An annular groove 25 provided with a trapezoidally shaped cross section is machined into the housing 18 for the locking of the coupling part 12, and the coupling part 12 is provided with radial bores 26 within which are arranged the locking balls 27.

The movement of the actuating piston 24—in FIGURE 2 from the right toward the left—takes place in this embodiment by a pressure medium which is supplied by way of a pressure line 28 connected to the coupling part 12 and a bore 29 to a pressure space 30 that in turn is sealed with respect to a bore 32 by means of a packing ring 31. The return of the actuating piston 24 is effected by means of a helical compression spring 33 which is supported, on the one hand, against a collar 34 at the actuating piston 24 and, on the other, against a collar 35 provided at the inner walls of the coupling part 12.

For the connection of the two coupling parts 11, 12 with one another, there is arranged within the bore 21 of the coupling part 11 an annular groove 36 having a trapezoidally shaped cross section. Radial bores 37 are accommodated within the hollow pin portion 20 of the coupling part 12, within which are disposed connecting balls 38.

With the pressure line 28 relieved, the actuating piston 24 is retained in the illustrated position by means of the compression spring 33 coordinated thereto or operatively associated therewith. At that time, the locking balls 27 are disposed approximately only with one half thereof in the bores 26 and in the annular groove 25, that is, the coupling part 12 is secured at the housing and is therefore locked.

During movement of the actuating piston 24 by means of the pressure medium, the connecting balls 38 are pressed by means of an inclined surface 39 at the actuating piston 24 into the radial bores 37 and into the annular groove 36. Simultaneously therewith, the radial bores 26 previously closed by the collar 34 are freed or released, and the locking balls 27 escape or fall back in the inward direction. As a result thereof, the two coupling parts 11 and 12 are rigidly connected with each other whereas the locking action on the coupling part 12 is lifted.

When the pressure line 28 is relieved, the return of the actuating piston 24 takes place by means of the compression spring 33. The locking balls 27 are thereby pressed again into the radial bores 26 and into the annular groove 25 by a further inclined surface 40 at the actuating piston 24. Simultaneously therewith, the actuating piston 24 releases the radial bores 37 and the connecting balls 38 can escape or fall back in the inward direction. The coupling part 11 is now freely displaceable in the housing 18 whereas the coupling part 12 is locked.

The latter case occurs with an exclusive steering of the front axle or axles whereas in case of a common steering of all steerable axles, both coupling parts 11 and 12 have to be rigidly connected with each other and have to be displaceable in unison within the housing 18.

The coordination of the radial bores to the annular grooves in the locking as well as in the connecting mechanism has to take place, of course, in such a manner that the respective shifting operation can take place only when the vehicle wheels are in the straight driving position.

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are encompassed by the scope of the appended claims.

We claim:

1. A disengageable coupling for a multi-wheel steering system in motor vehicles, comprising disengageable coupling means adapted to be actuated by a pressure medium including relatively fixed housing means provided with an aperture, two plunger-piston-like coupling parts, locking means within said coupling means between one coupling part, on the one hand, and the housing means, on the other, connecting means within said coupling means disposed between said two coupling parts for connecting the same with each other, and actuating means for actuating said locking and connecting means by a pressure medium, one of said coupling parts at the same time forms a pressure cylinder, and said actuating means includes actuating piston means arranged within said last-mentioned coupling part and axially displaceable against a spring force.

2. The combination according to claim 1, wherein said disengageable coupling is used for cross-country type vehicles and is operable as a connection between two parts of a power-transmitting member whose one part is connected with the front axle steering linkage and whose other part is connected with the rear axle steering linkage, said housing means aperture being continuous and cylindrical, each of said coupling parts being adapted to be connected with a respective one of the two parts of the force-transmitting member, said one coupling part being operatively associated with the rear axle steering linkage, said two coupling parts being accommodated within said cylindrical aperture of the housing means in substantially coaxial and mutually overlapping relationship.

3. The combination according to claim 2, wherein the coupling part accommodating the actuating piston means is provided with pressure medium connecting means, and helical compression spring means operatively associated with said last-mentioned coupling part, said spring means being supported, on the one hand, against a collar at the actuating piston means, and, on the other, against a collar provided at the inner walls of said last-mentioned coupling part.

4. The combination according to claim 3, wherein said locking and connecting means include ball detent means having connecting balls arranged within radial bores of the inner coupling part, said actuating piston means being provided with an inclined surface operable to force the connecting balls radially outwardly into an annular groove provided in the outer coupling part upon application of pressure to the actuating piston means so that both coupling parts are securely connected with each other, the ball detent means of the locking means having locking balls located within an annular groove provided in said housing means and in radial bores of the coupling part coordinated to the rear axle which are released in the inward direction upon application of pressure on the actuating piston means.

5. The combination according to claim 4, wherein said actuating piston means includes a further inclined surface, the locking balls arranged in the radial bores of the last-mentioned coupling part, being forced radially outwardly into the annular groove of the housing means by the further inclined surface of the actuating piston means upon relieving of the pressure line and return of the piston means by the spring means so that the last-mentioned coupling part and housing means are locked with respect to each other and simultaneously therewith the connecting balls are released for escape in the inward direction.

6. The combination according to claim 5, wherein the annular grooves for accommodating the locking and connecting balls of the ball detent means have an essentially trapezoidally shaped cross section.

7. The combination according to claim 2, wherein the coupling part accommodating the actuating piston means is provided with pressure medium connecting means, and helical compression spring means operatively associated with said last-mentioned coupling part.

8. A disengageable coupling for a multi-wheel steering system in motor vehicles, comprising disengageable coupling means adapted to be actuated by a pressure medium including relatively fixed housing means provided with an aperture, two plunger-piston-like coupling parts, locking means within said coupling means between one coupling part, on the one hand, and the housing means, on the other, connecting means within said coupling means disposed between said two coupling parts for connecting the same with each other, and actuating means for actuating said locking and connecting means by a pressure medium, said locking and connecting means include ball detent means having connecting balls arranged within radial bores of the inner coupling part, said actuating piston means being provided with an inclined surface operable to force the connecting balls radially outwardly into an annular groove provided in the outer coupling part upon application of pressure to the actuating piston means so that both coupling parts are securely connected with each other, the ball detent means of the locking means having locking balls located within an annular groove provided in said housing means and in radial bores of the coupling part coordinated to the rear axle which are released in the inward direction upon application of pressure on the actuating piston means.

9. The combination according to claim 8, especially for cross-country type vehicles where the disengageable coupling is operable as a connection between two parts of a power-transmitting member whose one part is connected with the front axle steering linkage and whose other part is connected with the rear axle steering linkage, wherein said housing means aperture is continuous and cylindrical, each of said coupling parts is adapted to be connected with a respective one of the two parts of the power-transmitting member, said one coupling part being operatively associated with the rear axle steering linkage, said two coupling parts are accommodated within said cylindrical aperture of the housing means in substantially coaxial and mutually overlapping relationship.

10. The combination according to claim 9, wherein said actuating piston means includes a further inclined surface, the locking balls arranged in the radial bores of the last-mentioned coupling part, being forced radially outwardly into the annular groove of the housing means by the further inclined surface of the actuating piston means upon relieving of the pressure line and return of the piston means by the spring means so that the last-mentioned coupling part and housing means are locked with respect to each other and simultaneously therewith the connecting balls are released for escape in the inward direction.

11. The combination according to claim 10, wherein the annular grooves for accommodating the locking and connecting balls of the ball detent means have an essentially trapezoidally shaped cross section.

12. The combination according to claim 9, wherein the annular grooves for accommodating the locking and connecting balls of the ball detent means have an essentially trapezoidally shaped cross section.

13. The combination according to claim 8, wherein said actuating piston means includes a further inclined surface, the locking balls arranged in the radial bores of the last-mentioned coupling part, being forced radially outwardly into the annular groove of the housing means by the further inclined surface of the actuating piston means upon relieving of the pressure line and piston means by the spring means so that the last-mentioned coupling part and housing means are locked with respect to each other and simultaneously therewith the connecting ball are released for escape in the inward direction.

14. The combination according to claim 13, wherein the annular grooves for accommodating the locking and connecting balls of the ball detent means have an essentially trapezoidally shaped cross section.

15. The combination according to claim 8, wherein the annular grooves for accommodating the locking and connecting balls of the ball detent means have an essentially trapezoidally shaped cross section.

16. A disengageable coupling for a multi-wheel vehicle steering system between one coupling part drivingly connected with the front axle steering linkage and another coupling part drivingly connected with the rear axle steering linkage, comprising: a relatively fixed housing; a first interengaging element movable between a locked position locking said another coupling part with said housing to prevent movement of said rear axle steering linkage and a release position allowing said another coupling part to move relative to said housing for movement of said rear axle steering linkage; a second interengaging means movable between a locked position between said coupling parts drivingly connecting them together for simultaneous movement of said front and rear axle steering linkages and a release position allowing relative movement between said coupling parts; a single fluid operated piston means operating said interengaging elements movable separate from said coupling parts between a first position with said first interengaging element in its locked position and said second interengaging element in its release position, and a second position with said first interengaging element in its release position and said second interengaging element in its locked position.

17. The combination according to claim 16, wherein said housing has a single continuous bore extending internally along its entire longitudinal dimension; said first coupling part being tubular and engaging the interior walls of said housing bore; said second coupling part being tubular and engaging the interior walls of said housing bore; one of said coupling parts having a longitudinally extending extension telescopically engaging within the other of said coupling parts; said second interengaging element being between said longitudinal extension and said other of said coupling parts; a first one of said coupling parts having an interior cylinder of the same diameter as and receiving therein said piston means.

References Cited

UNITED STATES PATENTS

| | | | |
|---|---|---|---|
| 2,837,370 | 6/1958 | Stott et al. | 294—83 |
| 2,848,246 | 8/1958 | Ruf | 280—91 |
| 2,974,974 | 3/1961 | Merritt | 280—91 |
| 3,094,345 | 6/1963 | Gaylord | 294—83 X |

KENNETH H. BETTS, *Primary Examiner.*